(12) United States Patent
Miller

(10) Patent No.: US 6,439,360 B1
(45) Date of Patent: Aug. 27, 2002

(54) REEL DISPENSER FOR POWER CORD APPLICATION

(75) Inventor: Thomas J. Miller, Chino Hills, CA (US)

(73) Assignee: TMC Enterprises, a divison of Tasco Industries, Inc., Diamond Bar, CA (US)

( * ) Notice: Subject to any disclaimer, the term of this patent is extended or adjusted under 35 U.S.C. 154(b) by 0 days.

(21) Appl. No.: 09/483,148

(22) Filed: Jan. 13, 2000

(51) Int. Cl.$^7$ ............................................... H02G 11/02
(52) U.S. Cl. .................................. 191/12.2 R; 191/12.4
(58) Field of Search ........................... 191/12.2 R, 12.4, 191/12 R; 242/107, 106; D13/137.4; 174/135; 439/501

(56) References Cited

U.S. PATENT DOCUMENTS

| | | | | |
|---|---|---|---|---|
| 1,944,264 A | * | 1/1934 | Oravec et al. ............... 242/108 |
| 3,542,172 A | * | 11/1970 | Meletti ...................... 191/12.2 |
| 3,657,672 A | * | 4/1972 | Flick et al. ................... 335/21 |
| 3,753,531 A | * | 8/1973 | Katoh ........................ 242/68.3 |
| 4,096,552 A | * | 6/1978 | Ben-Porat ................... 363/104 |
| 4,146,191 A | * | 3/1979 | Cavanaugh ................. 242/107 |
| 4,184,650 A | * | 1/1980 | Nelson et al. ............. 242/71.8 |
| 4,282,954 A | * | 8/1981 | Hill ........................... 191/12.4 |
| 4,726,534 A | * | 2/1988 | Chenoweth ................ 242/71.9 |
| 4,880,180 A | * | 11/1989 | Adair ........................ 242/71.8 |
| 4,997,142 A | * | 3/1991 | Grant ...................... 242/118.4 |
| 5,645,147 A | | 7/1997 | Kovacik et al. |

* cited by examiner

*Primary Examiner*—S. Joseph Morano
*Assistant Examiner*—Frantz F. Jules
(74) *Attorney, Agent, or Firm*—Knobbe, Martens, Olson & Bear, LLP

(57) ABSTRACT

An extension cord reel assembly having a housing which has a spool portion and a mounting portion is provided. A spool member having at least one flange member that is continuously welded to a surface upon which the extension cord is to be stored is positioned within the spool portion of the housing. The mounting portion of the housing of the reel assembly is positioned adjacent an outer perimeter of the spool member and is adapted to attach to a suspension member from which the reel assembly can be suspended above the ground.

2 Claims, 9 Drawing Sheets

REEL DISPENSER FOR POWER CORD APPLICATION

BACKGROUND OF THE INVENTION

1. Field of the Invention

The present invention relates to a reel assembly for power cord applications and, in particular, concerns a reel assembly for storing power cords, wherein the reel assembly is suitable for being hung or suspended above the ground via a hook assembly.

2. Description of the Related Art

In many household and shop applications, the use of an extension cord to provide power for power tools or for lights is common. Extension cords are typically used to extend the source of power from a wall into the center of a room or outside of a building to a place where work is to be performed. One typical application of the use of an extension cord is to provide a source of light to the place where the work is to be performed. For example, when working on cars, it is common for individuals to use a trouble lamp to illuminate a portion of the car on which the work is to be done. This results in an extension cord extending across the floor from the source of power, which is typically located at a wall receptacle, to the position at which the car is parked.

It will be appreciated that the use of such extension cords often creates hazards as a result of the extension cord being strewn across the ground. Moreover, extension cords readily become tangled. As a consequence, when individuals wish to use an extension cord, oftentimes a considerable amount of time is spent untangling the extension cord prior to deploying the extension cord. This lost time, of course, is frustrating for the individual and creates inefficiencies in performing work.

To address this particular need, various reel mechanisms have been developed for storing extension cords for both power outlets and trouble lamps when not in use. One typical extension cord reel is disclosed in U.S. Pat. No. 5,645,147 to Kovacik et al. Kovacik discloses a reel assembly into which the majority of the length of the extension cord can be stored when not in use. The reel has an electrical plug which allows the reel to be plugged into a wall socket and an opening through which the extension cord can be deployed. The Kovacik reference also discloses the use of a generally circular housing which is rotatably mounted to a bracket that allows the reel assembly to be hung off of the ground in a location adjacent a wall socket. The cord is stored on an interior pulley which is generally spring loaded such that the extension cord can be retracted back inside of the housing when not in use.

While the Kovacik reference does disclose a device that reduces the problems associated with extension cords, there are several limitations in the Kovacik device. In particular, the manner in which the Kovacik device is constructed results in the Kovacik device being generally unstable when it is hung off of the floor. In particular, the Kovacik device uses a U-shaped bracket that has two arms which attach at the center of the generally circular housing in which the extension cord is stored. Hence, the point of attachment of the bracket to the housing is generally at the center of mass of the housing which is relatively distal from the point of suspension of the housing. As a consequence, the torque produced on the mounting hook as a result of motion of the housing in increased. It will be appreciated that these devices are routinely hung from precarious holds adjacent the work area such that users can easily bump into the reel assembly which can cause the reel assembly to fall to the ground. Moreover, the users also tend to extend and retract the extension cord while the housing is suspended above the ground. The extension and retraction of the extension cord causes the housing to move relative to the suspension point which can also cause the housing to become dislodged and fall to the ground. This can result in damage to the reel assembly over time and, at a minimum, represents an inconvenience to the user. Further, the U-shaped bracket in Kovacik covers a significant portion of the outer housing of the assembly thereby eliminating this space as a space in which additional components, such as circuit breakers, can be mounted.

Moreover, the manufacture of reel assemblies, such as the assembly disclosed in the Kovacik reference, is generally complicated. In particular, the extension cord on these types of assemblies is typically stored on a generally cylindrical reel member. The reel member defines a surface that is generally bounded by two flange members on the lateral ends of the surface. The flange members extend vertically outward from the plane of the surface so as to retain the extension cord in proximity to the surface. For ease of assembly, the spool member generally has one flange member that is fixedly attached to the spool member. The second flange member is mounted onto the spool member after the installation of the extension cord so as to facilitate the ease of installation of the extension cord on the spool member. Typically, the second flange member is made of metal and is attached to the spool member through the use of clips and the like.

However, over repeated use, the metal flange members can rust which can ultimately result in the spool member binding during extension and retraction of the extension cord. Moreover, repeated use of the spool member can result in breakage of the clips that attach the metal flange member to the spool member. It will be appreciated that these reel assemblies are often used in harsh conditions where they are periodically dropped or banged and that the repeated extension and retraction of the extension cord exerts a continued force against the clips. Hence, over time the extension cord assembly often fails at the clips causing the flange member to detach from the spool member or causing a clip to break off and bind the spool member.

Hence, there is a need for an extension cord assembly which can be more stably mounted to a surface adjacent an extension cord such that it is less likely to be dislodged. Moreover, there is also a need for an extension cord assembly that is less likely to be damaged through continued use of the assembly. To this end, there is a need for an improved manner of constructing a spool member such that the spool member is more resistant to damage resulting from prolonged use.

SUMMARY OF THE INVENTION

The aforementioned needs are satisfied by the extension cord reel assembly of the present invention which, in one embodiment, is comprised of a spool assembly that is adapted to receive the extension cord, a housing assembly that is adapted to contain the spool assembly having an opening from which the extension cord can be extended, and a suspension assembly mounted adjacent a first edge of the housing that allows the spool assembly to be suspended from the suspension assembly so as to be retained off of the ground. Because the bracket assembly is mounted to the housing adjacent a first edge of the housing, the likelihood that the housing will become dislodged as a result of movements of the housing stemming from vibrations or people extracting or retracting the cord is reduced.

In one particular embodiment, the suspension assembly is comprised of a generally U-shaped bracket that, on an upper surface of the U-shaped bracket, includes a hanger member. The U-shaped bracket is attached to a protrusion formed on a first side of the housing wherein the spool member is positioned within the portion of the housing that does not comprise the protrusion. In this way, the retractable extension cord assembly is less likely to be dislodged by vibrations as the center of mass of the housing assembly is located beneath the attachment point of the bracket assembly.

In another aspect of the invention, the spool member, which is adapted to receive the extension cord for storage within the housing, includes at least one flange member which extends upward from the surface of the spool member upon which the extension cord resides so as to retain the extension cord on the spool member wherein the at least one flange member is continuously attached to an outer edge of the spool member via a continuous weld. Attaching the flange member in this fashion reduces the likelihood that the flange member will become dislodged from the spool member as a result of dropping the assembly or repeated extensions and retractions of the extension cord. In one particular embodiment, the spool member is formed of a plastic material and the flange member is also formed of a plastic material that is ultrasonically welded to the spool member. The use of a plastic material further reduces the tendency of the reel assembly to become inoperable over time as a result of rust of the spool member.

It will be appreciated that the reel assembly of the present invention is less likely to be dislodged from its suspension location, is easier to manufacture and is more durable than existing extension cord reel assemblies of the prior art. These and other objects and advantages of the present invention will become more fully apparent from the following description taken in conjunction with the accompanying drawings.

DETAILED DESCRIPTION OF THE PREFERRED EMBODIMENTS

Figure 1A:
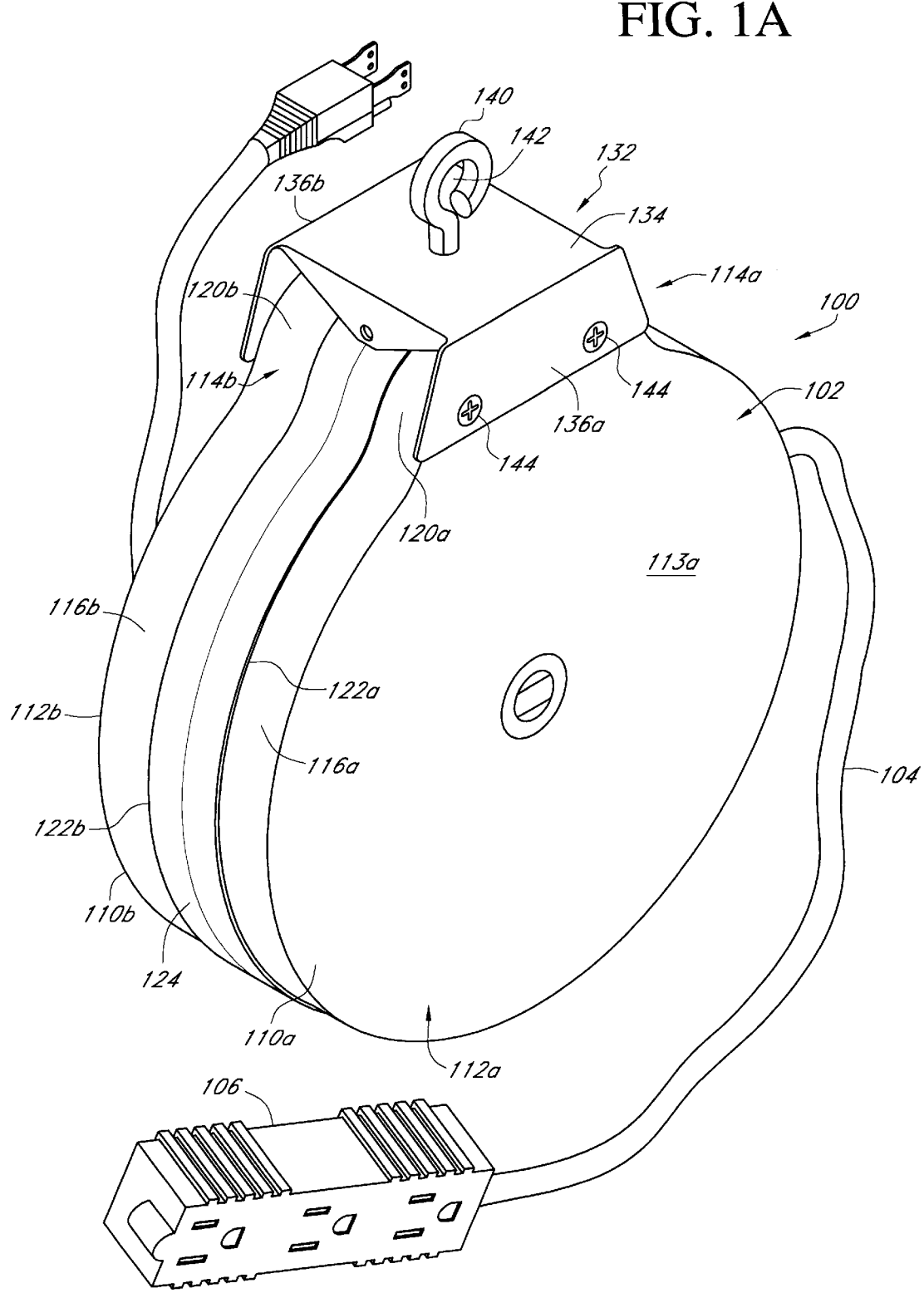
FIG. 1A is a front perspective view of an extension cord reel assembly of the preferred embodiment.
Figure 1B:
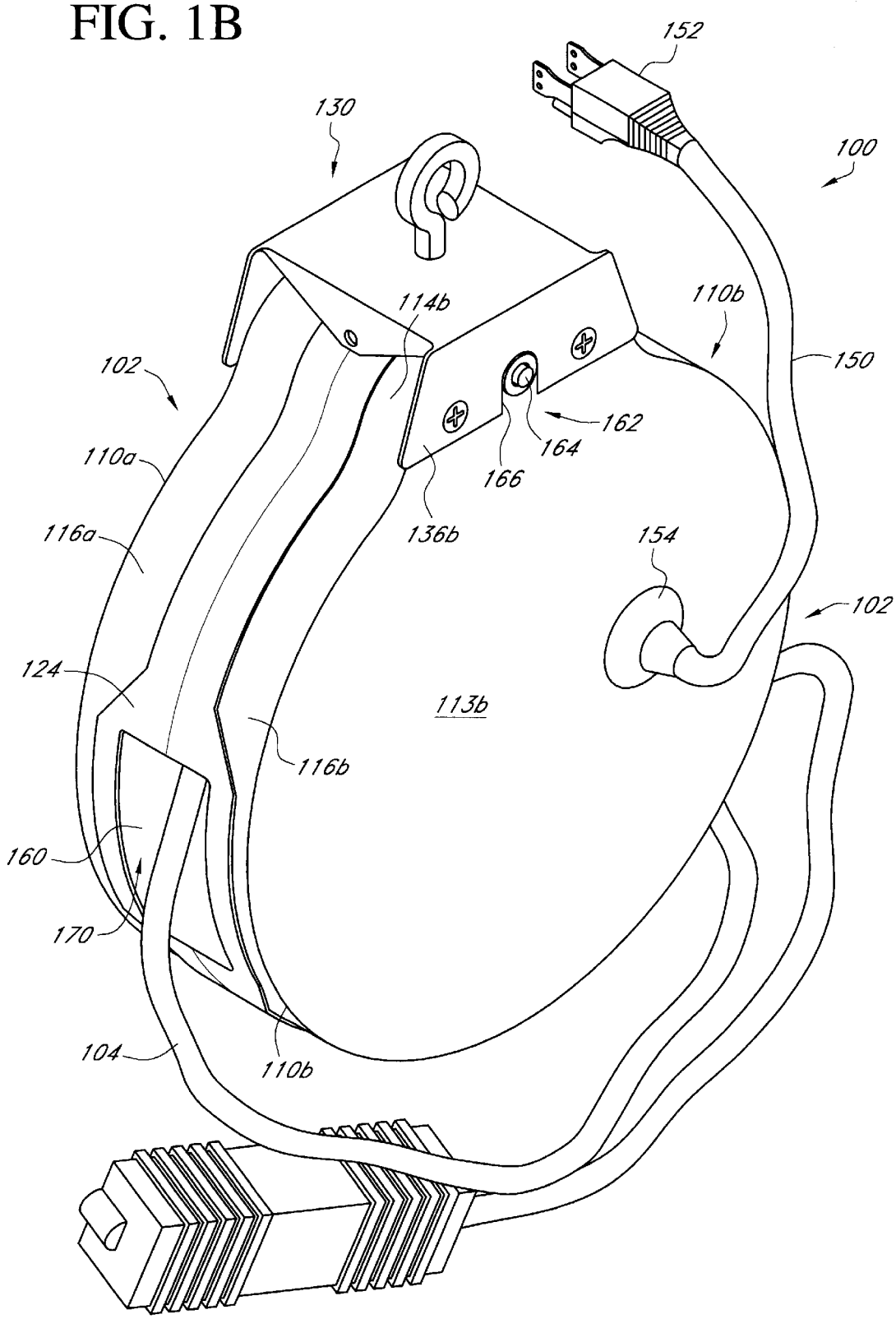
FIG. 1B is a rear view of the extension cord reel assembly of FIG. 1A.

Reference will now be made to the drawings wherein like numerals refer to like parts throughout. FIGS. 1A and 1B illustrate the basic components of an extension cord reel assembly 100 of the present invention. The extension cord reel assembly 100 includes a housing 102 that is adapted to retain unused portions of an extension cord 104 on a retracting spool assembly that is spring loaded in a well-known manner. The extension cord 104 is, in this embodiment, terminated with a plurality of receptacles 106 but it will be appreciated that the extension cord reel assembly 100 can also be used with commonly available trouble lamp assemblies of the prior art.

The housing 102 is essentially comprised of two housing member 110a, 110b. Each of the housing members 110a, 110b is comprised of spool portions 112a, 112b, and mounting portions 114a, 114b. The spool portions 112a, 112b are generally circular in shape and are adapted to receive a generally cylindrical spool member in a manner that will be described in greater detail below in reference to FIG. 2. Hence, each of the spool portions 112a, 112b of the housing members 110a, 110b define outer perimeters 116a, 116b that are generally circular in shape. In particular, as is illustrated in FIGS. 1A and 1B, the outer perimeters 116a, 116b of the spool portions 112a, 112b are generally perpendicular to the faces 113a, 113b of the housing members 110a, 110b. At a first portion of the outer perimeter 116a, 116b of the spool portion 112a, 112b of each of the housing members 110a, 110b there is a mounting perimeter 120a, 120b of the housing member 110a, 110b.

Essentially, the faces 113a, 113b of the housing members 110a, 110b protrude beyond the outer perimeters 116a, 116b of the spool portions 112a, 112b of the housing members 110a, 110b so as to define the mounting portions 114a, 114b of the housing members 110a, 110b. The mounting portions 114a, 114b further include outer perimeter sections 120a, 120b that also extend perpendicularly to the faces 113a, 113b in the manner shown in FIGS. 1A and 1B. Each of the outer perimeter sections 116a, 116b of the spool portions 112a, 112b and the outer perimeter sections 120a, 120b of the mounting portions 114a, 114b of the housing members 110a, 110b extend generally the same distance from the faces 113a, 113b of the housing members 110a, 110b so as to define an edge 122a, 122b that is located substantially the same distance from the faces 113a, 113b of the housing members 110a, 110b.

As is illustrated in FIGS. 1A and 1B, the edges 122a, 122b are positioned within a compressible connector 124 and are secured therein to connect the housing members 110a, 110b. The compressible connector 124 is essentially comprised of a flexible piece of plastic that defines openings that receive the edges 122a, 122b and retains the edges within the openings via frictional engagement. The compressible connector 124 extends substantially around the outer perimeter of the spool portion 112a, 112b and the mounting portions 114a, 114b of the housing members 110a, 110b so as to provide a generally liquid tight seal for the cavity 160 defined within the housing members 110a, 110b.

As is also illustrated in FIGS. 1A and 1B, a suspension assembly 130 is attached to the mounting portions 114a, 114b of the housing members 110a, 110b. The suspension assembly 130 is comprised of a generally U-shaped bracket 132 having an upper member 134 and two parallel side members 136a, 136b. The suspension assembly 130 also includes a hanging member 140, which in this embodiment is comprised of a hook, that defines an opening 142. The hanging member 140 is preferably attached to the center of the upper member 134 of the U-shaped bracket 132. The suspension assembly 130 is adapted to permit the extension cord reel assembly 100 to be suspended via the hanging member 140 from a suspension point, such as a nail attached to a wall or a cable extending above the surface of the ground. The suspension assembly 130 is connected to the mounting portion 114a, 114b of the housing 102 via screws 144 in a manner that will be described in greater detail below.

FIG. 1B illustrates some additional features about the extension cord reel assembly 100. In particular, FIG. 1B illustrates a back face 113b of the housing 102. Centered in the back face 113b of the housing 102 is a receptacle cord 150 that has a plug 152 adapted to be plugged into a receptacle (not shown). The receptacle cord 152 extends into an inner cavity 160 defined by the housing 102 so as to be electrically connected with the extension cord 104 that is stored within the housing 102 in a manner that will be described in greater detail below. The receptacle cord 150 with the plug 152 is relatively short in length as the housing 102 is adapted to be mounted in a location that is adjacent a receptacle such that the extension cord 104 that is stored within the housing 102 can be extracted in a well-known manner. Preferably, the receptacle cord 150 extends into the cavity 160 via an opening in the face 113b of the housing member 110b which is also preferably secured with a well-known grommet 154.

As is also illustrated in FIG. 1B, the extension cord reel assembly 100 of the preferred embodiment includes a receptacle circuit breaker 162 that is mounted within the mounting portion 114b of the housing member 110b. In particular, the circuit breaker 162 is comprised of a resettable push button 164 that extends through an opening in the mounting portion 114b of the housing member 110b in the manner shown in FIG. 1B. As is also shown in FIG. 1B, the side member 136b of the U-shaped bracket 132 has a cut out 166 that is adapted to fit around the outer perimeter of the push button 164 comprising the resettable circuit breaker 162. It will be appreciated that the outer face of the side member 136b of the U-shaped bracket 132 extends outward from the outer face 113b of the housing member 110b. Hence, the push button 164 is recessed within the cut out 166 defined by the suspension assembly 130. As the button 164 is recessed, it is less likely that the circuit breaker will be inadvertently activated as a result of movement of the housing 102.

As is also illustrated in FIG. 1B, the housing 102 also defines an opening 170 through which the extension cord 104 exits the cavity 160. The opening 170 is located so as to be generally below the mid-point of the center of the spool portions 112a, 112b of the housing members 110a, 110b. The opening 170 in this embodiment is generally rectangular in shape and, as will be described in greater detail below, the cord is positioned on a spool member such that the cord extends off of the spool member so as to extend generally vertically downward through the opening 170. The opening 170 is formed by removing a portion of the outer perimeters 116a, 116b of the spool portions 112a, 112b of the housing members 110a, 110b. The compressible connector 124 is also positioned about the outer perimeter of the opening 170 so as to prevent the cord from being abraded during extension and retraction of the cord 104 within the housing 102. By positioning the opening 170 in this location with the cord oriented in the manner shown in FIG. 1B, extension and retraction of the cord 104 will generally exert a more vertical force on the housing 102. Thus, the force that is exerted on the housing 102 is less likely to dislodge the hanging member 140 from a suspension point as the force is generally vertical as opposed to horizontal.

Figure 2:
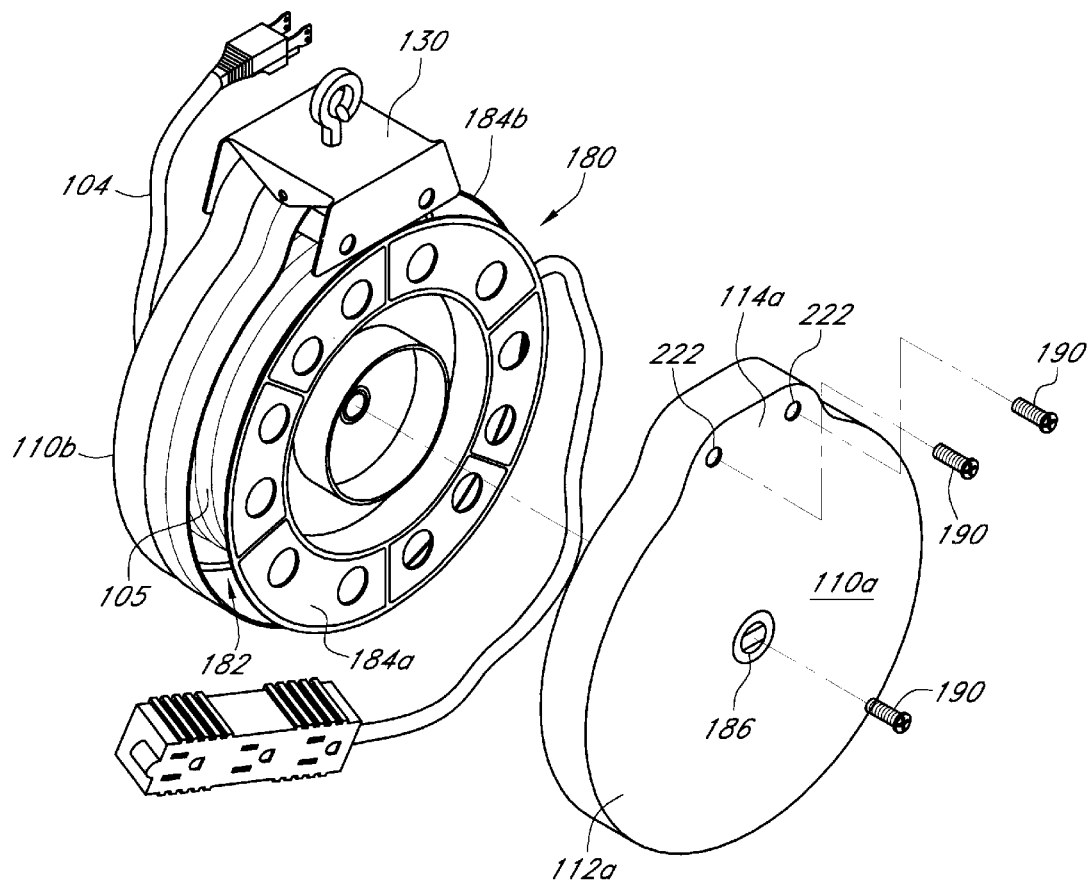
FIG. 2 is a partially exploded perspective view of the extension cord reel assembly of FIGS. 1A and 1B.

FIG. 2 illustrates the interior components of the extension cord reel assembly 100 of the preferred embodiment. In particular, the housing 110a has been removed so as to expose a spool member 180. As is illustrated in FIG. 2, the spool member 180 is positioned within the spool portions 112a, 112b of the housing members 110a, 110b. In this embodiment, the spool member 180 is generally cylindrical in shape and defines a cylindrical surface 182 that is adapted to receive the stored portion 105 of the extension cord 104. As is also illustrated in FIG. 2, the cylindrical surface 182 of the spool member 180 is bounded on either side by flange members 184a, 184b that help to retain the stored portion 105 of the cord 104 on the surface 182. The spool member 180 is rotatably mounted to the housing member 110a, 110b via a pivot assembly 186 such that the spool member 180 can rotate about the pivot assembly 186 in a well-known manner to allow the cord 104 to be stored and deployed.

As is illustrated in FIG. 2, the spool member 180 is positioned substantially within the spool portion 112a, 112 of the housing members 110a, 110b thereby leaving space within the mounting portion 114a, 114b of the housing members 110a, 110b available such that additional components, like the circuit breaker 162, can be mounted therein with the circuit breaker being generally flush with the outer face 113b of the housing member 110b. As is understood in the art, the spool member 180 is preferably rotatably mounted within the spool portions 112a, 112b of the housing members 110a, 110b so as to be spring loaded such that an extension cord can be withdrawn off of the surface 182 of the spool member 180 to a desired length and then, by activation of the known spring mechanism, the extended portion of the extension cord can be wound up onto the surface 182 of the spool member 180 through the opening 170 in the housing 102. The operation of the retraction and extension mechanism of the extension cord reel assembly is substantially the same as of those available in the prior art.

As will be described in greater detail below, the construction of the spool member 180 and, in particular, the addition of the flange members 184, allow for a simplified and more durable extension cord reel assembly 100. As is further illustrated in FIG. 2, the housing members 110a, 110b are secured together both by the combination of the engagement between the outer perimeters of the housing members 110a, 110b being engaged by the compressible connector 124 and through the use of fasteners 190 that extend through the housing 110a, 110b.

Figure 3A:
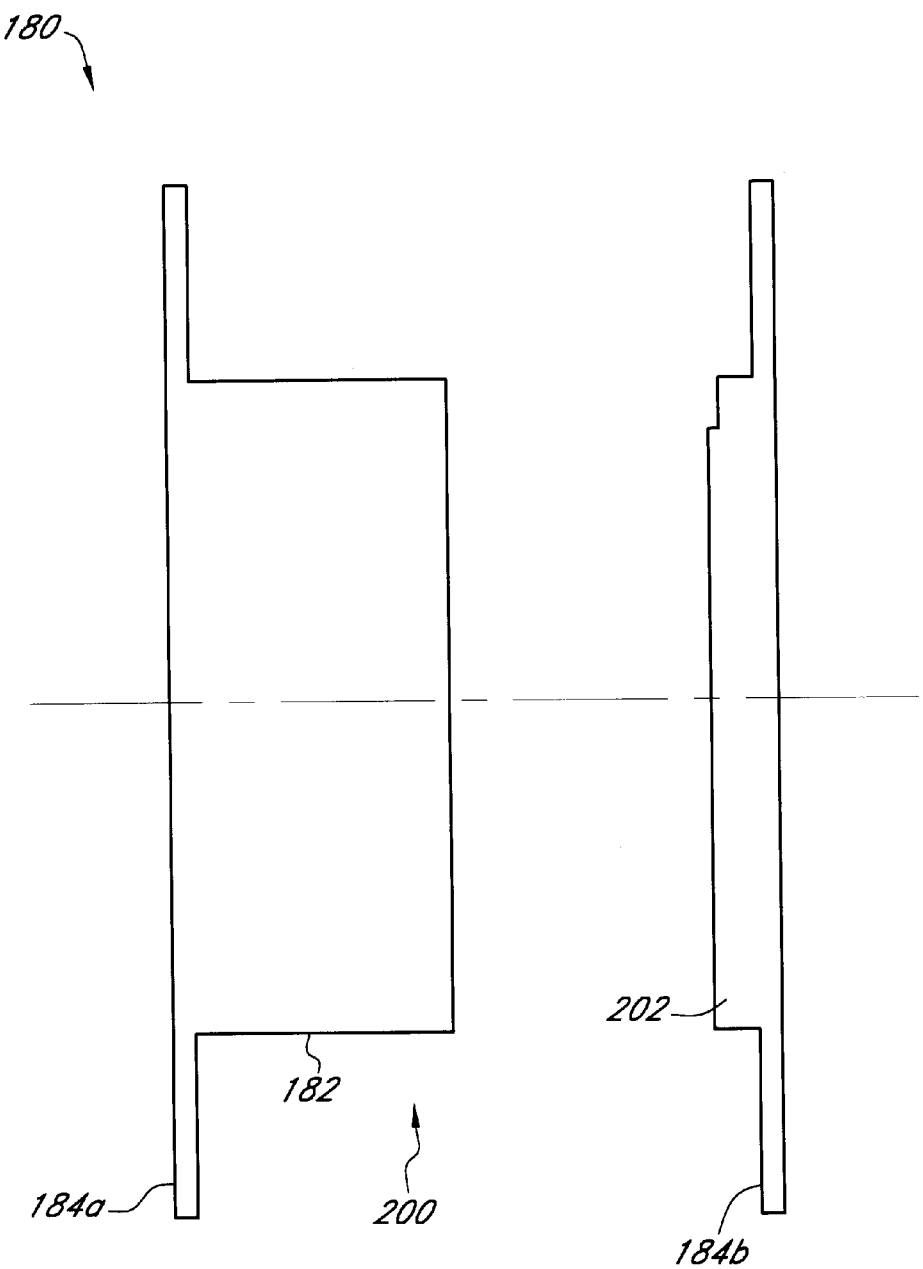
FIGS. 3A, 3B and 3C are schematic views illustrating a spool member with an attached flange member of the extension cord reel assembly of FIGS. 1A and 1B.
Figures 3B, 3C:
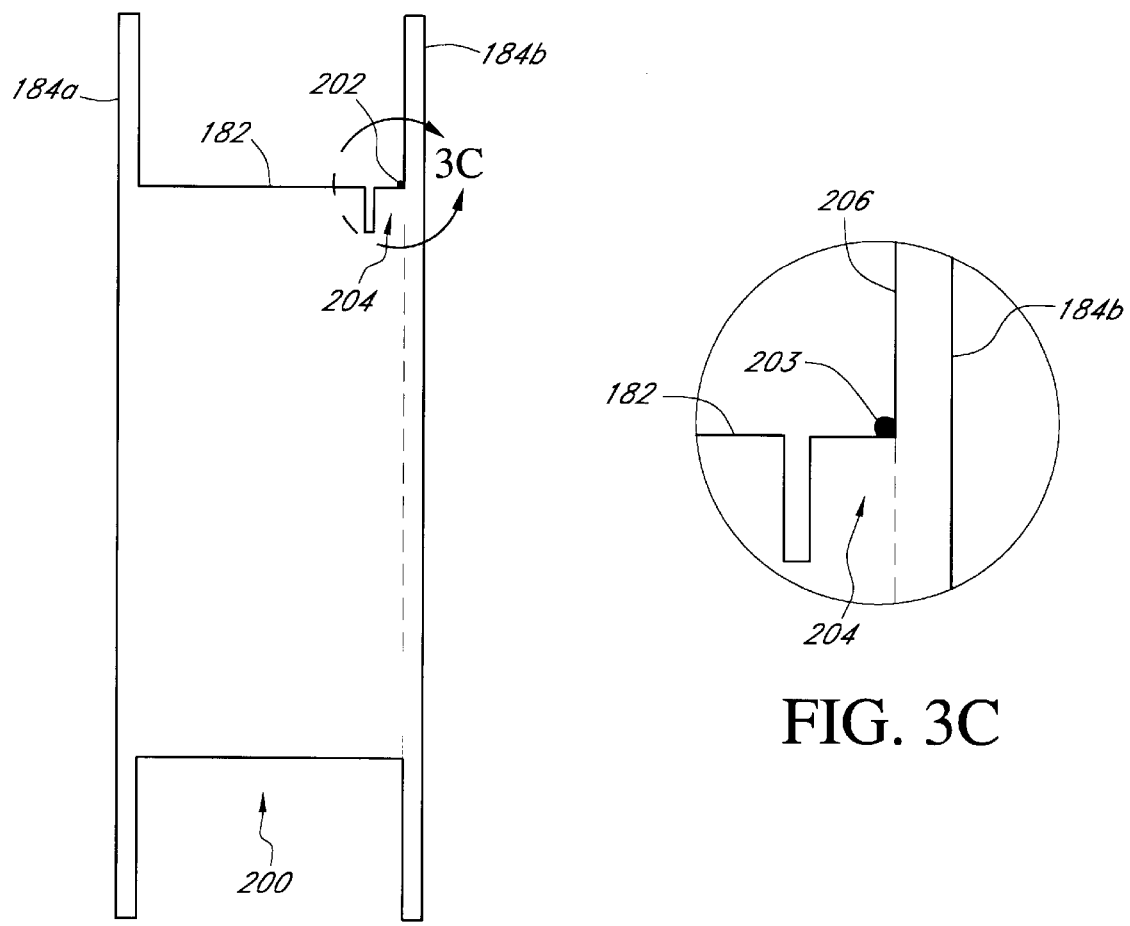

The construction of the spool member 180 will now be described in greater detail in reference to FIGS. 3A–3C. In this embodiment, the spool member 180 includes a first cylindrical member 200 whose outer surface defines the cylindrical surface 182 that is to receive the stored electrical cord 105 in the manner described above. A first flange member 184 is preferably integrally formed to the cylindrical member 200 in the manner shown in FIG. 3A. The integral flange member 184a extends perpendicularly outward from the surface 182 so as to retain the cord 105 in proximity to the surface 182. Preferably, the cylindrical member 200 is formed of a plastic material that is lightweight, yet strong. In this embodiment, the spool member 180 also comprises a detachable flange member 184b that is separate from the cylindrical member 200 with the integral flange member 184a. The detachable flange member 184b includes a mounting section 202 that is adapted to be positioned inside of the innermost section of the cylindrical member 200 in the manner illustrated in FIG. 3B. Specifically, the mounting section 202 is positioned inside of the cylindrical member 200 such that the flange member 184b abuts the surface 182.

Preferably, an ultrasonic weld 203 is used to interconnect the flange member 184b to the surface 182 defined by the cylindrical member 200. Basically, a bead of plastic is positioned at the interface between the surface 182 and the flange member 184b and is then vibrated at an ultrasonic frequency so as to fuse the innermost surface 206 of the flange member 184b to the outer surface 182 of the cylindrical member 200. The use of such an ultrasonic weld eliminates the need for clips or other retainers that can become broken or dislodged through repeated use of the reel assembly. Hence, the spool member 180 is more simply constructed and is lighter weight but is less prone to failure as a result of forces being exerted upon discrete clips holding the flange member onto the spool member.

Figure 4:
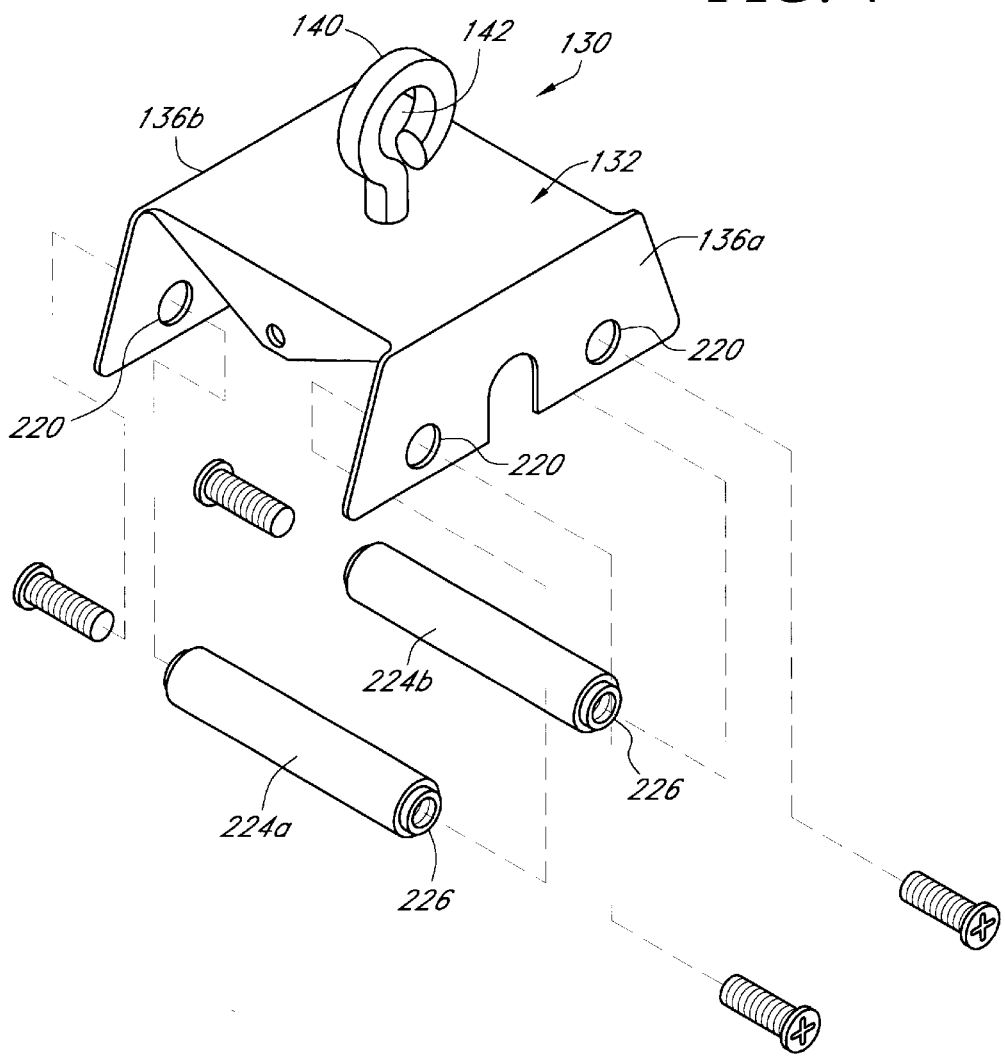
FIG. 4 is an exploded perspective view illustrating an attachment assembly of the extension cord reel assembly of FIGS. 1A and 1B.

FIG. 4 is an exploded perspective view which illustrates the components of the suspension assembly 130 in greater detail. As discussed above, the suspension assembly 130 includes the U-shaped bracket 132 that has the upper member 134 upon which the hanger member 140 is mounted so as to extend perpendicularly out of the plane of the upper member 134 of the U-shaped bracket 132. The U-shaped bracket also defines two parallel side members 136a, 136b which have openings that are adapted to receive the fasteners 190 which connect the suspension assembly 130 to the housing members 110a, 110b. As is illustrated in FIG. 4, aligned openings 220 are formed in each of the side members 136a, 136b of the U-shaped bracket 132. These aligned openings 220 are aligned with openings 222 (FIG. 2) in the mounting portion 114a, 114b of the housing members 110a, 110b. Moreover, cylindrical reinforcing members 224a, 224b are positioned inside of the cavity 160 defined by the mounting portions 114a, 114b of the housing members 110a, 110b so as to extend between the aligned openings 220 of the suspension assembly 130. The reinforcing members 224 are preferably made of strong material, such as steel, and define apertures 226 that are adapted to receive the fasteners 190.

In particular, the fasteners 190 are inserted through the aligned openings 220 in the suspension member 130 and the openings 222 in the housing members 110a, 110b and engage with either each other or with the interior surfaces of the openings 226 of the reinforcing members 224 so that the weight of the spool member 180 with the stored cord is distributed across the reinforcing members 224 and is not borne entirely by the surface of the mounting portion 114a, 114b of the housing members 110a, 110b at the point of connection to the suspension assembly 130. It will be appreciated that, over time, if the weight of the entire reel assembly was directly placed upon the outer surfaces of the housing members 110a, 110b at the point of connection between the suspension member 130 and the housing members 110a, 110b without the use of such reinforcing members, the housing members may eventually break or crack at the interconnection point. By using such reinforcing members 224, a lighter weight material can be used to form the housing members 110a, 110b thereby reducing the overall cost and weight of the reel assembly 100.

Figure 5:
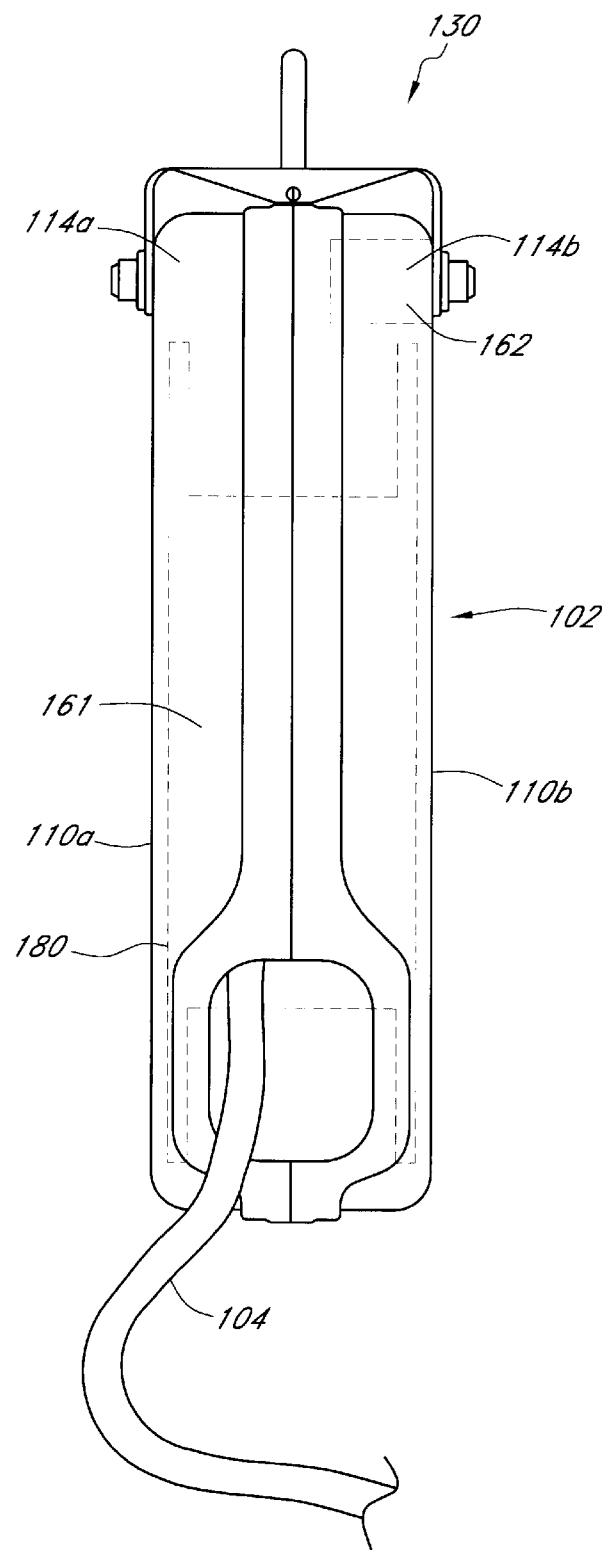
FIG. 5 is a front view of the reel assembly of FIGS. 1A and 1B illustrating the position of a circuit breaker container positioned within the housing.

As is illustrated in FIG. 5, the use of housing members 110a, 110b that define a mounting section 114a, 114b that is not occupied by the spool assembly provides an interior space 161 within the cavity 160 of the housing 102 that is not occupied by the spool member 180. This allows for the installation of the reinforcing members and further allows the circuit breaker 162 to be mounted substantially inside of the cavity 160 defined by the housing members 110a, 110b. Consequently, a more compact reel assembly 100 can be formed as a result of the configuration of the housing members 110a, 110b.

Figure 6A:
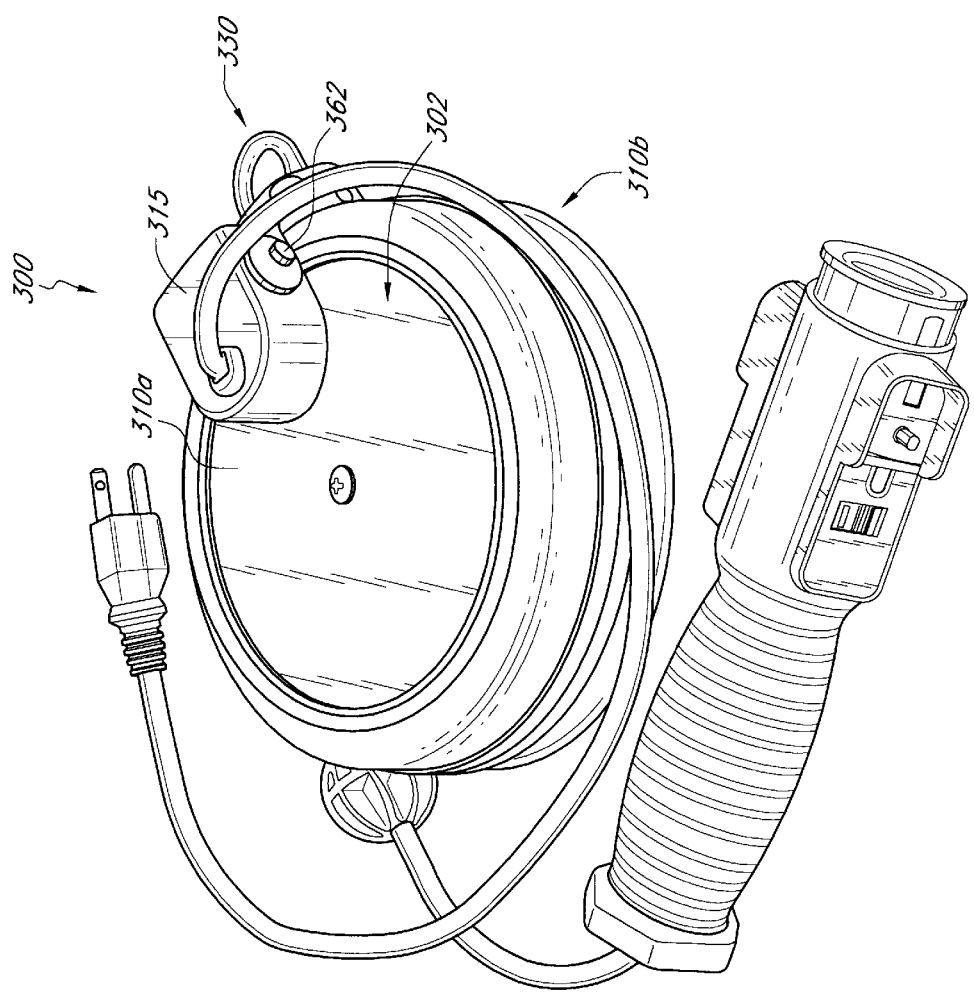
FIG. 6A is a front perspective view of another embodiment of an extension cord reel assembly suitable for use with the spool members illustrated in FIGS. 3A–3C.
Figure 6B:
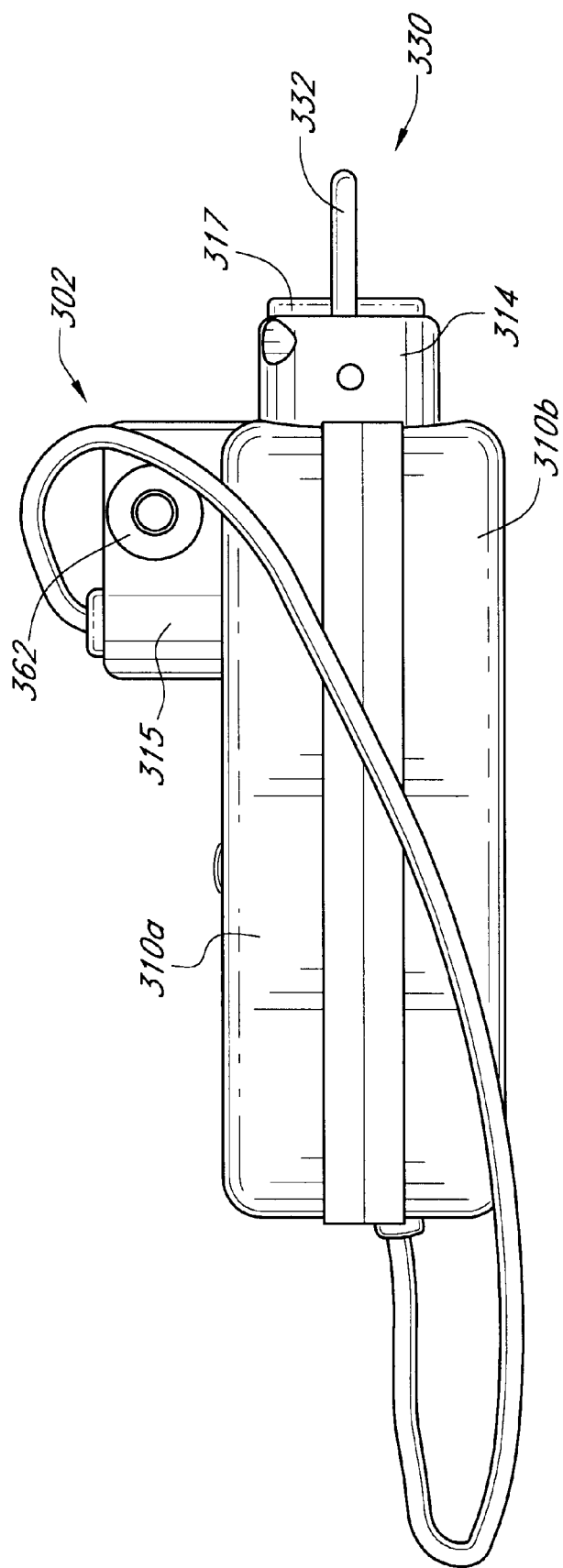
FIG. 6B is a side view of the extension cord reel assembly of FIG. 6A.

FIGS. 6A and 6B illustrate another configuration of an extension cord reel assembly 300. It will be appreciated from the foregoing description that the spool assembly 180 can be adapted for use with any of a number of different configurations of housings without departing from the spirit of the present invention. In particular as is illustrated in FIG. 6, a smaller reel assembly 300 can also be used to store an extension cord 304 that is contained on a spool member similar to the spool member 180 described above. The spool member 180 can be manufactured in the same way but simply have different dimensions to match the dimensions of the outer housing 302.

In this embodiment, the assembly 300 includes a housing 302 that is made of plastic that is comprised of two housing members 310a, 310b that are bound together. The housing 302 also includes a spool portion 312 containing the plastic welded spool 180 and a circuit breaker portion 315 that contains a circuit breaker 362. As is illustrated, the circuit breaker portion comprises a protrusion that extends outward from the face of the housing member 310a. The circuit breaker 362 is positioned in the circuit breaker portion 315 so as to be perpendicular the plane of the face of the housing member 310a so as to reduce the likelihood of inadvertent tripping of the circuit breaker 362 in a similar manner as described above.

The assembly 300 also includes a suspension assembly 330 positioned on an outer perimeter of the housing 302. In this embodiment, the suspension assembly 330 is comprised of a retaining portion 314 that is integrally attached to the outer perimeter of the housing 302. The retaining portion 314 defines a first surface 317 upon which a ring 332 is attached so as to extend vertically outward. Hence, the suspension assembly 330 also allows for mounting at a point located distal from the center of mass of the spool portion of the assembly 300 in the manner described above. Further, since both the retaining portion 314 and the circuit breaker portion 315 are positioned out of the spool portion 312 of the assembly 300, installation and operation of the spool member 180 contained therein is simplified.

In this embodiment, the housing 302 including the spool portion 312, the retaining portion 314 and the circuit breaker portion 315, are preferably integrally formed through a well-known plastic injection process. Further, in this embodiment, the cord 304 terminates in a well-known trouble light 306 rather than the plurality of receptacles illustrated above. A person of ordinary skill in the art will realize that there are numerous interchangeable features between each of the two illustrated embodiments.

From the foregoing, it will be appreciated that the reel assembly of the preferred embodiment can be more stably suspended above the ground as a result of having the suspension assembly 130 attached to a mounting portion of the housing that is adjacent an outer edge of the reel assembly housing. Forces exerted upon the housing 102 will generally result in the center of mass pivoting about the point of connection between the suspension member and the surface to which the suspension member is attached. By removing the point of connection between the suspension member and the housing from the center of gravity, the resulting torques are likely to be reduced such that the reel assembly 100 is less likely to be accidentally dislodged.

It will also be appreciated that the construction of the spool assembly 180 results in a simplified, yet more durable spool assembly that is less likely to be damaged. In particular, the use of a continuous ultrasonic weld to interconnect the flange members to the surface upon which the cord is to be stored results in a substantially uniformly connected spool member which does not have fasteners that are likely to become dislodged as a result of repeated retraction and extensions of the extension cord. Lastly, it will also be appreciated that the configuration of the housing of the reel assembly allows for components, such as circuit breakers and reinforcing members, to be positioned within the cavity defined by the housing which results in more planar reel assembly.

Although the foregoing description of the preferred embodiment of the present invention has shown, described and pointed out the fundamental novel features of the invention, it will be understood that various omissions, substitutions and changes in the form of the detail of the apparatus as illustrated, as well as the uses thereof, may be made by those skilled in the art without departing from the spirit of the present invention. Consequently, the scope of the present invention should not be limited to the foregoing discussion, but should be defined by the appended claims.

What is claimed is:

1. An extension cord reel assembly comprising:

a housing having edges and faces so as to define a cavity having a spool portion and a mounting portion wherein the mounting portion cavity is positioned at an outer perimeter of the spool portion of the cavity and wherein an access opening is formed in the housing adjacent the spool portion of the cavity;

a suspension assembly coupled to the housing adjacent the mounting portion of the housing wherein the suspension assembly includes a suspension member mounted so as to extend outward from the edge to allow the suspension member to be mounted on an exposed surface, such that the housing can pivot with respect to the exposed surface in two directions and wherein the suspension assembly comprises:

a U-shaped bracket having two side members and an interconnecting member wherein the two side members are connected to the housing adjacent the mounting portion of the housing; and the suspension member attached to the interconnecting member so as to allow the housing to be suspended above the ground by engagement between the suspension member and a suspension location and wherein the suspension assembly is attached to the housing such that the spool portion of the housing is located beneath the connection point of the U-shaped bracket to the mounting portion of the housing and wherein the suspension assembly further includes one or more reinforcing members that extend between the two side members of the U-shaped bracket in the mounting portion of the housing;

a spool member mounted within the spool portion of the housing wherein an electrical cord is stored on the spool member and can exit the cavity via the access opening in the housing; and a circuit breaker having a push button wherein the push button of the circuit breaker is mounted in a cutout formed in one of the side members of the U-shaped bracket so that the button is at least partially protected by the side member of the U-shaped bracket.

2. An extension cord reel assembly comprising:

a housing defining an outer perimeter and a cavity wherein an access opening is formed in the outer perimeter of the housing;

a suspension assembly attached to the outer perimeter of the housing wherein the suspension assembly is adapted to permit the housing to be suspended from an elevated protrusion and retained on the elevated protrusion wherein the suspension assembly comprises:

a U-shaped bracket having two side members and an interconnecting member wherein the two side members are connected to the housing adjacent the mounting portion of the housing;

a suspension member attached to the interconnecting member so as to allow the housing to be suspended above the ground by engagement between the suspension member and a suspension location wherein the suspension assembly is attached to the housing such that the spool portion of the housing is located beneath the connection point of the U-shaped bracket to the mounting portion of the housing; and one or more reinforcing members that extend between the two side members of the U-shaped bracket in the retainer portion of the housing;

a spool member mounted within the spool portion of the housing wherein the spool member is comprised of a cylindrical member having a first and a second end defining a cylindrical surface wherein a fixed flange member is integrally formed at the first end of the cylindrical member wherein the spool member also includes a detached flange member that is mounted to the second end so as to extend outward from the cylindrical surface wherein the detached flange member is attached to the cylindrical surface of the cylindrical member via a weld at the interface between the circular surface and the flange;

an electrical cord positioned on the cylindrical surface so as to be retained thereon by the detached flange member such that a portion of the electrical cord extends outward through the access opening in the housing; and a circuit breaker having a push button wherein the push button of the circuit breaker is mounted in a cutout formed in one of the side members of the U-shaped bracket so that the button is at least partially protected by the raised side member of the U-shaped bracket.

* * * * *